(12) United States Patent
Abry et al.

(10) Patent No.: US 10,213,705 B2
(45) Date of Patent: Feb. 26, 2019

(54) PROCESS FOR RECOVERING PROCESSING LIQUIDS FROM STREAMS CONTAINING ALKALINE EARTH METAL SALTS

(71) Applicant: CCR Technologies, Ltd., Houston, TX (US)

(72) Inventors: Raymond G. F. Abry, Calgary (CA); Terrance Trofimuk, Calgary (CA); Steven Ayres, Calgary (CA)

(73) Assignee: CCR Technologies, Ltd., Houston, TX (US)

( * ) Notice: Subject to any disclaimer, the term of this patent is extended or adjusted under 35 U.S.C. 154(b) by 207 days.

(21) Appl. No.: 15/327,349

(22) PCT Filed: Jul. 22, 2015

(86) PCT No.: PCT/US2015/041474
§ 371 (c)(1),
(2) Date: Jan. 18, 2017

(87) PCT Pub. No.: WO2016/014628
PCT Pub. Date: Jan. 28, 2016

(65) Prior Publication Data
US 2017/0203229 A1    Jul. 20, 2017

Related U.S. Application Data

(60) Provisional application No. 62/027,484, filed on Jul. 22, 2014.

(51) Int. Cl.
| | | |
|---|---|---|
| *B01D 3/34* | (2006.01) | |
| *B01D 3/10* | (2006.01) | |
| *B01D 53/14* | (2006.01) | |
| *B01D 53/26* | (2006.01) | |
| *B01D 3/14* | (2006.01) | |

(52) U.S. Cl.
CPC ............ *B01D 3/34* (2013.01); *B01D 3/10* (2013.01); *B01D 3/143* (2013.01); *B01D 53/1425* (2013.01); *B01D 53/263* (2013.01); *B01D 2252/2023* (2013.01); *B01D 2256/245* (2013.01)

(58) Field of Classification Search
CPC ...... B01D 2252/2023; B01D 2256/245; B01D 3/10; B01D 3/143; B01D 3/34; B01D 53/1425; B01D 53/263
See application file for complete search history.

(56) References Cited

U.S. PATENT DOCUMENTS

| | | |
|---|---|---|
| 5,152,887 A | 10/1992 | Beasley et al. |
| 5,158,649 A | 10/1992 | Beasley et al. |
| 5,389,208 A | 2/1995 | Beasley et al. |
| 5,441,605 A | 8/1995 | Beasley et al. |
| 5,993,608 A | 11/1999 | Abry et al. |
| 6,508,916 B1 | 1/2003 | Razzaghi et al. |
| 2011/0033350 A1 | 2/2011 | Flaks |
| 2013/0136434 A1 | 5/2013 | Graibus et al. |

*Primary Examiner* — Renee Robinson
*Assistant Examiner* — Derek N Mueller
(74) *Attorney, Agent, or Firm* — Bushman Werner, P.C.

(57) ABSTRACT

A process for recovering processing liquids from a feed stream which contains processing fluid, water, and at least one alkaline earth metal cation. The process includes reacting at least one alkaline earth metal cation with a suitable anion to form a substantially water-insoluble salt precipitate, the precipitate being formed in one of a fractionation column having a forced recycle loop or a flash vessel having a forced heated recycle loop.

17 Claims, 3 Drawing Sheets

PROCESS FOR RECOVERING PROCESSING LIQUIDS FROM STREAMS CONTAINING ALKALINE EARTH METAL SALTS

CROSS REFERENCE TO RELATED APPLICATION

This application claims priority to U.S. Application No. 62/027,484 filed on Jul. 22, 2014 the disclosure of which is incorporated herein by reference for all purposes.

FIELD OF THE INVENTION

The present invention relates to a process for recovering a processing liquid, particularly from a feed stream containing processing liquid, water, and an alkaline earth metal cation.

BACKGROUND OF THE INVENTION

Processing liquids such as alcohols and glycols are used in the production of natural gas from oil and gas wells. Thus, typical processing liquids include alcohols and glycols such as mono-, di-, or tri-ethylene glycols (MEG, DEG, and TEG, respectively). When used in the production of natural gas, the processing liquids quickly become contaminated with water, e.g., produced water from the formation, as well as, alkaline metal cations such as magnesium, calcium, etc. and other contaminants primarily dissolved salts such as sodium chloride. Water-insoluble salts of the alkaline earth metal cations are a common cause of fouling in heat exchangers, reboilers, transfer lines, pumps, valves, etc. which are used in systems for recovering the processing liquid for reuse.

U.S. Pat. Nos. 5,152,887; 5,158,649; 5,389,208; 5,441,605; 5,993,608; and 6,508,916, all of which are incorporated herein by reference for all purposes, deal with the recovery or reclamation of processing fluids used in gas processing including the production of natural gas from oil and/or gas wells.

As noted above, processing liquids such as MEG used in natural gas production become contaminated with alkaline earth metal cations, primarily calcium and magnesium. Presently, to deal with these cations which can form substantially water-insoluble salts accompanied by the attendant problems described above, it is common to attempt to remove these cations prior to any regeneration and/or reclamation by effecting precipitation of the cations using precipitants such as carbonates, bicarbonates, hydroxides, etc. This "up-front" pre-treatment to remove the alkaline metal cations prior to the processing liquid being recovered invariably involves equipment such as residence tanks, valves, pumps, piping, filters, filter presses, and other equipment commonly used for separating precipitated solids from the processing liquid prior to regeneration and/or reclamation of the latter. In short, this pretreatment to remove the alkaline earth metal cations is expensive and can involve the utilization of valuable space, e.g., if the system was on an offshore platform.

SUMMARY OF THE INVENTION

In one aspect, the present invention provides a process for recovering a processing liquid from a feed stream containing the processing liquid and an alkaline earth metal cation.

In a further aspect, the present invention provides a process for recovering a processing liquid from a stream containing the processing liquid, water, and at least one alkaline earth metal cation.

In yet another aspect, the present invention provides a process for recovering a processing liquid from a feed stream containing the processing liquid, water, dissolved salts, and at least one alkaline earth metal cation.

These and further features and advantages of the present invention will become apparent from the following detailed description, wherein reference is made to the figures in the accompanying drawings.

DETAILED DESCRIPTION OF PREFERRED EMBODIMENTS

While the present invention will be described with particular reference to a feed stream used in the production of oil and gas, it is not so limited. Basically, the process of the present invention can be used in any process where there is a processing stream or liquid, however used, which becomes contaminated with alkaline earth metal cations (AMC) which form substantially water-insoluble salts. As used herein, the term "substantially water-insoluble salts" refers to a salt or mixture thereof wherein the solubility of the salt(s) in water is less than about 0.5 wt % at 0° C.

Basically, the process of the present invention can comprise a reclamation stage alone or in combination with a regeneration stage. With regard to the latter, it is common in oil and gas production to inject processing liquids, e.g., alcohols and glycols, into the well during production to alleviate the formation of gas hydrates or clathrates. Because these processing liquids cannot be readily disposed of and also due to their expense, it is necessary to recover them for reuse employing processes described in the above mentioned patents. The feed stream from the well, e.g., the stream containing the used processing liquids, invariably contains water from the formation, water of condensation, varying amounts of salts, e.g., sodium chloride, and other contaminants, e.g., AMC's. In general if the salt content is low, e.g., less than about 3 wt % of the feed stream, regeneration, basically a fractionation, will sometimes suffice to recover the processing liquid. In regeneration, the water is separated from the processing liquid in a fractionation column, the water being an overhead stream, the processing liquid being recovered as a bottoms stream. However, in cases where the feed stream returning from the well, in addition to the processing liquid and water, contains large amounts of salts, dissolved or suspended, then it is necessary to use a reclaiming step or a combination of regeneration and reclaiming.

Figure 1:
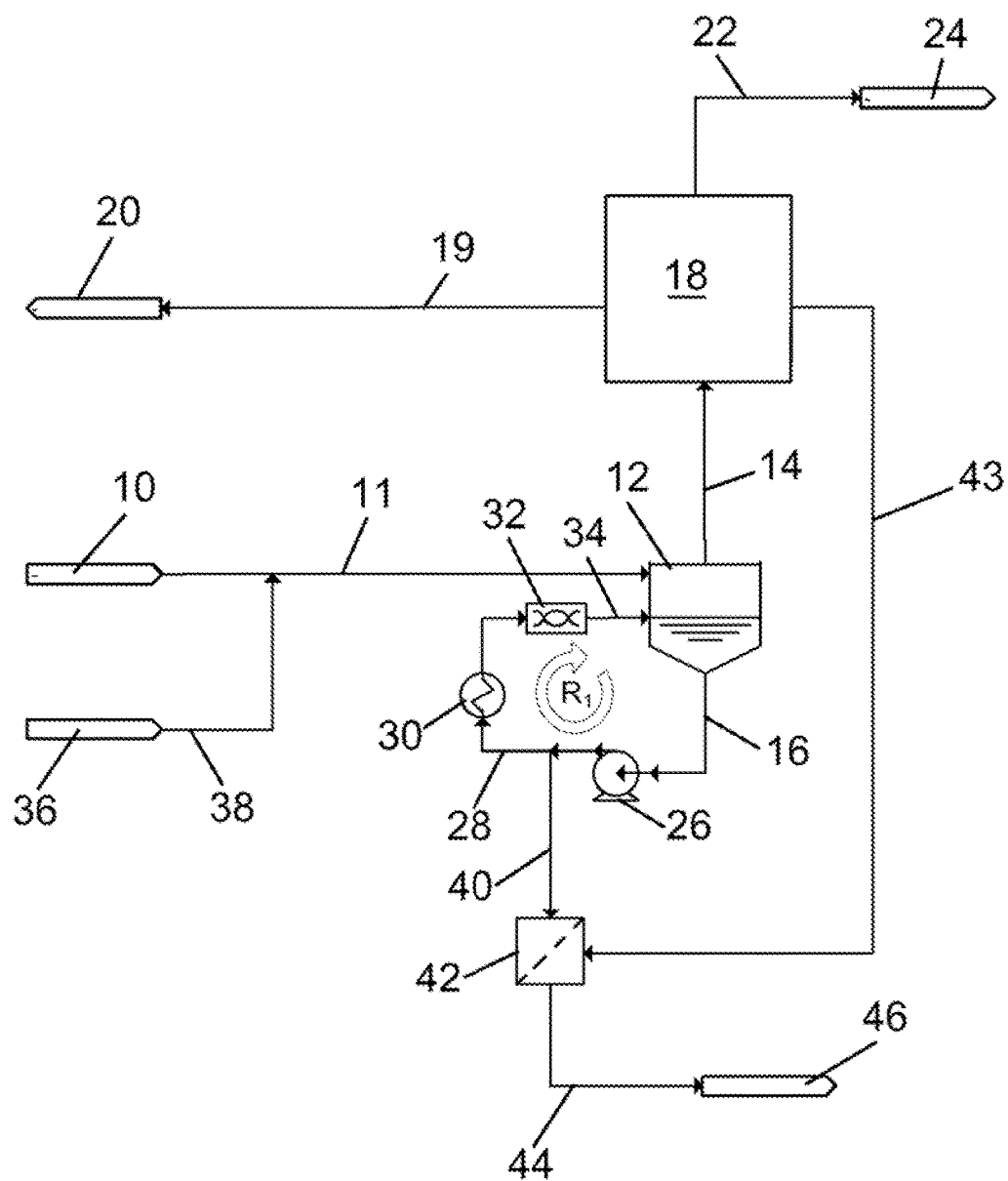
FIG. 1 is a schematic flow sheet of one embodiment of the process of the present invention.

Referring then to FIG. 1, there is shown a process flow scheme for a reclaiming process with a feed stream source containing high salt content, e.g. greater than about 3.0 wt %. A feed stream comprised of, for example, processing liquid, water, dissolved and suspended salts, and at least one AMC from a source 10 is introduced via line 11 into a flash vessel 12 from which there is produced an overhead vapor stream 14 and a bottoms, residuum stream 16. Overhead stream 14 comprises water, processing liquid, and any other volatile materials and is introduced into a product handling section 18. Product handling section 18 can comprise a fractionation column and various other equipment used in solid-liquid, liquid-liquid, and gas-liquid separation techniques. Purified processing liquid is removed from product handling section 18 via stream 20 for reuse. Portions of product handling section 18 as well as flash vessel 12 are under reduced pressure via line 22 and a vacuum system 24.

The residuum stream removed in 16 from flash vessel 12 passes via pump 26, line 28, heat exchanger 30 and in-line mixer 32 as a recycle stream to flash vessel 12 via line 34. It will be appreciated that the recycle stream can be admixed with the feed stream 11 from feed source 10 prior to being introduced into flash vessel 12. In effect, the loop $R_1$ formed inter alia by streams 12, 16, 26, 28, 30, 32 and 34 is a forced reboiler recycle loop.

There is a precipitant source 36 from which one or more precipitants can be introduced into flash vessel 12 via lines 38 and 11 to effect formation of the AMC precipitates.

A portion of the residuum stream in line 16 which comprises dissolved liquids including minor amounts of processing liquid, dissolved salts, and solids including precipitates of the AMCs is removed via line 40 and introduced into a residue handling zone 42. In residue handling zone 42, the residuum can be separated into solids, including any solids which were originally present in the feed stream from source 10 and any solids which are formed in flash vessel 12, and a liquid waste stream. The solids can be separated from the liquids, if desired, by any solid-liquid process or other separation techniques well known to those skilled in the art and can be discharged in one or more streams, e.g., stream 44 to a suitable waste discharge receiver 46.

The composition of the feed stream from feed source 10 can vary widely, particularly in the case of a processing liquid used in the production of oil and/or gas from wells. However, as noted invariably it will contain processing liquid, water, dissolved salts, and at least one AMC.

As noted, flash vessel 12 is under reduced pressure and is generally operated at a pressure of from about 0.03 to about 0.99 Bar and a temperature of from about 40 to about 165° C., depending upon the composition of the feed stream. Whether recycled directly to flash vessel 12 or, in admixture with the feed stream in line 11, circulation of residuum through recycle loop $R_1$ is generally conducted at a flow rate of about 10 ft/s or greater, preferably about 10 to about 20 ft/s.

Solids, water, and any other waste materials from product handling section 18 can be removed via line 43 and introduced into residue handling zone 42 and appropriately treated for disposal.

As noted above, one of the primary goals of the present invention is the removal of AMCs, and more particularly, salts of AMCs from the feed stream. To this end, and as discussed above, one or more suitable precipitants from a precipitant source 36 is introduced via line 38 into flash vessel 12 via line 11. It will be understood however, that the precipitant(s) can be introduced into the residuum recycle loop $R_1$ or directly into vessel 12, if desired. The introduction of a precipitant allows removal of AMC precipitates during this reclaiming stage as opposed to requiring any pre-treatment of the feed stream prior to introduction into the reclaiming stage.

The precipitants can be any of numerous anions that will react with the one or more AMCs that are present in the feed stream from feed source 10 to form a substantially water-insoluble salt. The AMCs can be anyone of the alkaline earth metal cations, but generally will be one of barium, calcium, magnesium, or strontium, and in particular, calcium and/or magnesium. Suitable precipitants include preferably water soluble salts such as water soluble carbonates, bicarbonates, hydroxides, sulfates, certain divalent carboxylic acid salts, such as oxalates, and the like. The selection and amount of precipitant(s) added will depend upon which and how much of the particular AMCs are present. This can be readily determined by well known analyses of the feed stream from the feed source 10 but is a function of the source of the feed stream.

Figure 2:
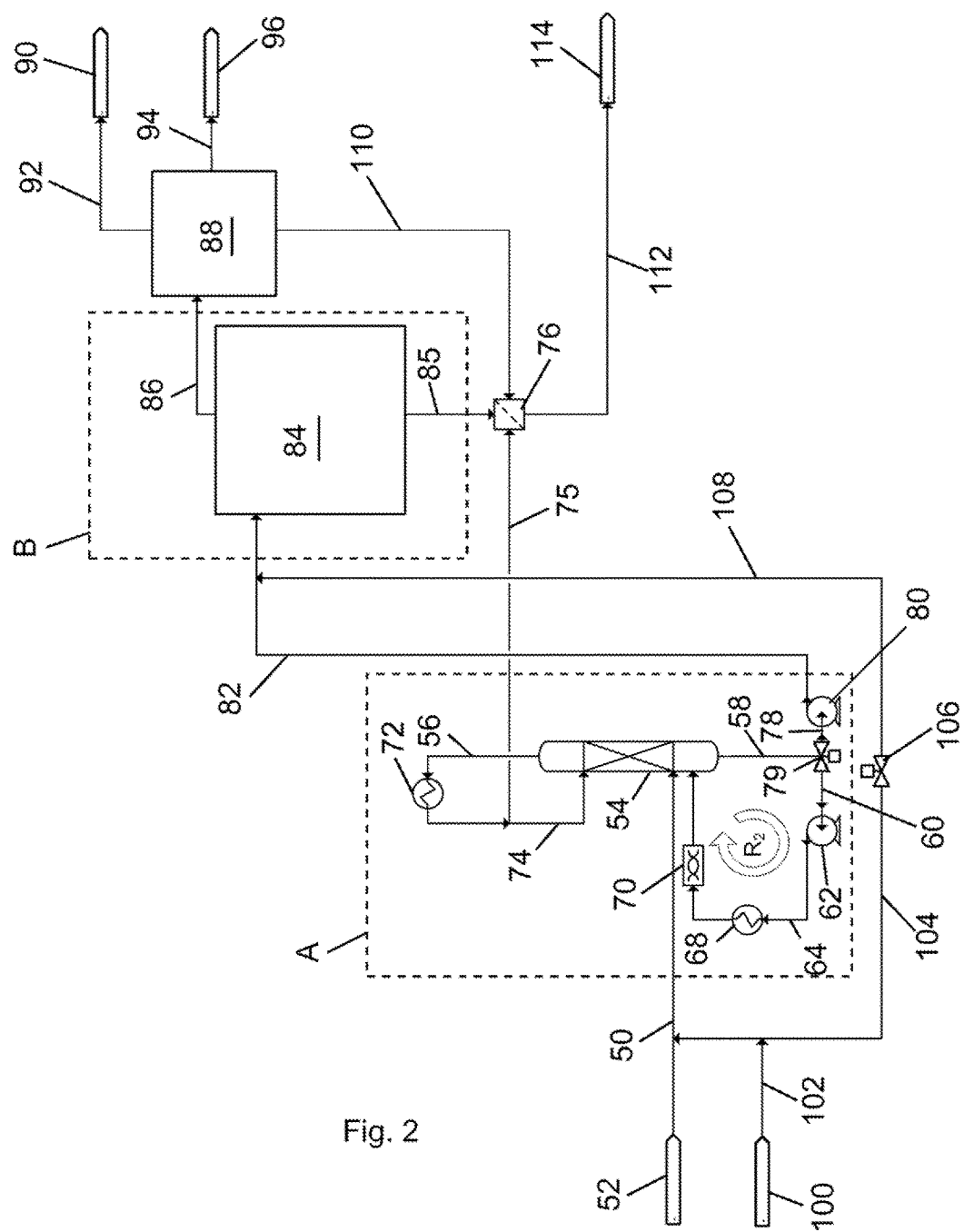
FIG. 2 is a schematic flow sheet of another embodiment of the process of the present invention.

Referring now to FIG. 2, there is shown a schematic flow sheet of another embodiment of the present invention wherein there is a regenerator section, as depicted by the dotted box A and a reclaimer section as depicted by the dotted box B. Referring then to FIG. 2, a feed stream 50 from a feed source 52 is introduced into a regenerator column 54 which is basically a fractionation column. An overhead stream is removed from column 54, via line 56, while a residuum/bottoms stream is removed from column 54 via line 58. The residuum stream is split into two portions, a first portion passing through a forced recycle loop $R_2$ comprising line 60, pump 62, line 64, heat exchanger 68, and in-line mixer 70 $R_2$ to be reintroduced into column 54. This portion of the residuum stream can alternatively be admixed with the feed in line 50 to be introduced into column 54.

An overhead stream via line 56 passes through a reflux loop comprised of a condenser 72 and line 74 back into column 54. A fraction of the overhead stream is sent via line 75 to a residue handling section 76 which performs substantially the same function described above with respect to product handling section 18 of the embodiment of FIG. 1. In this regard, it should be noted that the feed from feed source 52 comprises the processing liquid, water, any dissolved salts, and at least one AMC. Accordingly, the overhead vapour in line 56 from column 54 comprises primarily water since in all embodiments of the present invention the processing liquid comprises a higher boiling material than water.

A second portion of the residuum stream from line 58 is sent via line 78, pump 80, and line 82 into a reclaimer shown generally as 84 forming part of reclaimer section B. For all intents and purposes, reclaimer 84 operates under substantially the same conditions of temperature, pressure, recycle flow rate, etc. as in the case of reclaiming embodiment shown in FIG. 1. An overhead stream 86 removed from reclaimer 84 is quite similar to overhead stream 14 removed from flash vessel 12 as in the embodiment shown in FIG. 1. In like fashion, the overhead fraction in line 86 is introduced into a product handling section 88. As is the case in the embodiment shown in FIG. 1, the reclaimer 84 in reclaimer section B is under reduced pressure via a vacuum source 90 and line 92. As is the case of the embodiment of FIG. 1, via suitable separation techniques well known to those skilled in the art and discussed above with respect to the embodiment of FIG. 1, a purified processing liquid is removed via line 94 and sent to a product recovery section 96 for reuse.

As is the case in the embodiment shown in FIG. 1, a bottoms or residue fraction from reclaimer 84 is removed via line 85 and sent to residue handling section 76.

Via a precipitant source 100 and line 102, a first portion of one or more precipitants is introduced via line 104 and line 50 into column 54. A second portion of one or more precipitants from precipitant source 100 is introduced via line 104, valve 106, and line 108 into the reclaimer 84 as discussed above with respect to the embodiment of FIG. 1. As noted, the precipitant in line 108 is admixed with the residuum stream from column 54 and introduced with that residuum stream into reclaimer 84. Thus, one or more precipitants is introduced both into the regenerator section A and the reclaimer section B.

There is also a residue fraction removed from product handling section 88 via line 110 which is sent to residue handling section 76, residue handling section 76, as described above with respect to the embodiment of FIG. 1, serving to affect solid-liquid separation for discharge through one or more discharge lines 112 into waste receiver 114.

Conditions in the flash vessel forming part of reclaimer 84 are substantially the same as those described above with respect to the embodiment of FIG. 1.

With respect to column 54, column 54 is substantially a fractionator wherein the lighter water fraction is taken overhead via line 56 while processing liquid, salts including salts of the AMC and other heavies are removed via line 58. Forced recycle loop $R_2$ can be operated under substantially the same conditions as forced recycle loop $R_1$ described above with respect to the embodiment described in FIG. 1. In general, column 54 will operate at a pressure of from 0.9 to 2 Bar and at temperatures of from 95 to 135° C.

It will be understood that the embodiment of FIG. 2 will generally be employed when a feed stream from source 52 has a relatively high dissolved salt content greater than about 3% by weight. Under these conditions, the circulating salts in recycle loop $R_2$ can become highly concentrated with a reduced water content in the recycle loop $R_2$. Thus, in the embodiment shown in FIG. 2, when the water in recycle loop $R_2$ reaches a predetermined level relative to the salt content, a portion of the residuum, as shown, will be introduced into the reclaiming section B. If desired, this split of the residuum stream from line 58 can be accomplished using a control valve 79.

Generally speaking, once the water content in recycle loop $R_2$ falls below about 80 wt % of the recycle stream, the embodiment of FIG. 2 would be employed wherein at least a portion of the residuum stream is sent to reclaiming section B. It will be understood that because of the varying nature of the feed source 52, the composition of salts, water, and other constituents can vary widely the water content in the recycle loop $R_2$ is controlled by discharge through line 75 to residue handling section 76. Thus, it is within the skill of the art to adjust/control the amount of residuum 58 to circulate through recycle loop $R_2$ as opposed to the amount of residuum in line 58 which is sent via line 82 reclaimer section B.

Figure 3:
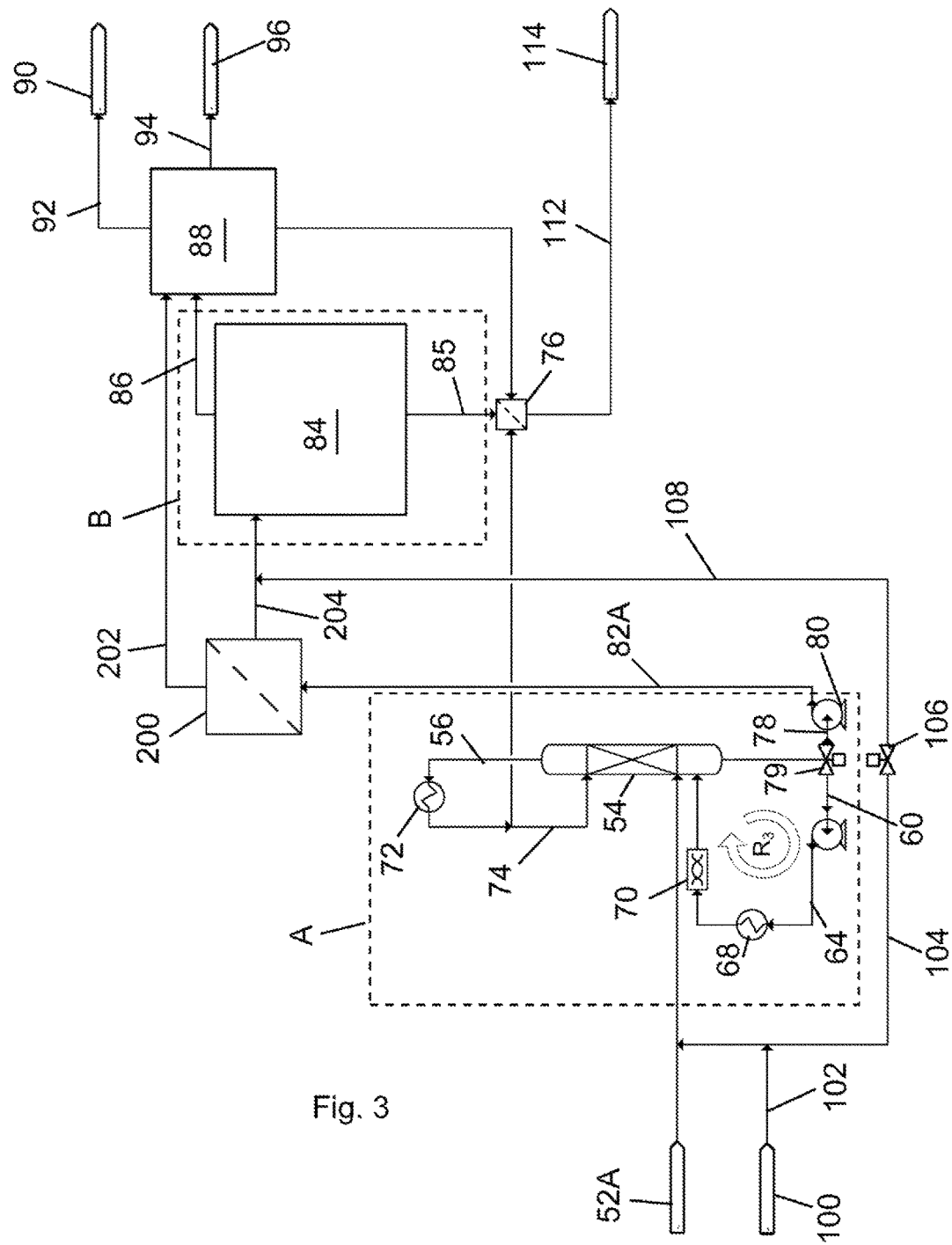
FIG. 3 is a schematic flow sheet of yet another embodiment of the process of the present invention.

Referring now to FIG. 3, there is shown another embodiment of the present invention. The embodiment shown in FIG. 3 is very similar to that shown in FIG. 2 with the exception that in the embodiment shown in FIG. 3 the feed stream emanating from feed source 52A has a salt loading, primarily dissolved, also at around 3 wt %. To more strictly control the concentration of the dissolved salts returning downhole in reuse of the processing liquid, a portion of the recycle stream line 82A from column 54 is introduced into a clarification/separation system 200 from which is removed a virtually solids free fraction comprising processing liquid, water at the requisite concentration and residual dissolved salts which is transferred via line 202 to product handling section 88. A second fraction from section 200 comprising solids, dissolved salts, water and any other residue type materials is removed via line 204 and introduced into reclaimer 84. In reclaimer 84, virtually all the dissolved salts and solids are removed and introduced via line 55 to residue handling zone 76 for eventual removal via line 112 to residue discharge location 114. Highly purified processing liquid and water are directed to the product handling zone 88 for eventual recombination with the contents of line 202 prior to delivery via line 94 to a product recovery section 96 for reuse. Conditions in the regenerator column 54 in the regenerator zone A are generally as those described above with respect to the regenerator 54 shown in the embodiment of FIG. 2. Likewise, conditions in reclaimer 84 of the embodiment shown in FIG. 3 are similar to those described above with respect to reclaimer 84 shown in the embodiment of FIG. 2.

Via a precipitant source 100, a first portion of one or more precipitants is introduced via line 102 and line 50 into column 54. A second portion of one or more precipitants from precipitant source 100 is introduced via line 104, valve 106, and line 108 into the reclaimer 84 as discussed above with respect to the embodiment of FIG. 1. As noted, the precipitant in line 108 is admixed with the second stream from clarification section 200 via line 204 and introduced with that residuum stream into reclaimer 84. Thus, one or more precipitants is introduced both into the regenerator section A and the reclaimer section B.

As can be seen from the above, the process of the present invention provides a simple, efficient way to separate generally water-insolube salts/precipitants of alkaline earth metal cations from processing fluids such as those used in the production of oil and gas. In particular, the utilization of a forced recirculating reboiler loop as disclosed and claimed in many of the aforementioned patents and as described herein with respect to the embodiments of FIGS. 1, 2, and 3, eliminates the need for pretreatment of used processing liquids to remove the AMC salts prior to their regeneration and/or reclamation. It will be understood that if desired, a regenerator section can be installed downstream of the reclaimer section, especially, for example, in the embodiment shown in FIG. 1 or integrated in the same.

With respect to the handling of the streams containing solids of either the AMC salts or otherwise, traditional solids-liquids separation processes can be used, thus settling tanks, centrifuges, filter presses, etc. can be employed. Furthermore, in some cases wherein the dissolved salt content of the feed stream is high, it may be desirable in the residue handling section to selectively remove these soluble salts from the generally water-insoluble salts via methods well known to those skilled in the art. In still other cases, the dissolved salts and precipitated solids can be removed and disposed of together.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A process for recovering a processing liquid from a feed stream comprising said processing liquid, water, at least one component less volatile than said processing liquid, and at least one alkaline earth metal cation, said process comprising:

introducing said feed stream into a first heating zone to volatilize said water to produce a vapor stream and a residuum stream, said vapor stream comprising water and any vaporized portion of said processing liquid, said residuum stream containing processing liquid, at least some of said less volatile component, and any solids originally present in said feed stream or formed in said first heating zone;

recovering and treating said vapor stream to produce purified processing liquid;

passing at least a portion of said residuum stream through a second heating zone to produce a heated recycle stream;

introducing said heated recycle stream into said first heating zone;

introducing at least one precipitant into said first heating zone, said precipitant comprising an anion which reacts with said cation to form a substantially water-insoluble precipitate of said alkaline earth metal cation; and removing at least some of said solids including at least some of said precipitate from said first heating zone.

2. The process of claim 1 wherein said precipitant is introduced into said feed stream to said first heating zone.

3. The process of claim 1, wherein said precipitant is introduced directly into said first heating zone.

4. The process of claim 1, wherein said precipitant comprises one of carbonate, sulfate, oxalate, hydroxide, and mixtures thereof.

5. The process of claim 1, wherein said alkaline earth metal cation is selected from one of calcium, magnesium, strontium, barium, and mixtures thereof.

6. The process of claim 1, wherein said first heating zone is under vacuum.

7. The process of claim 1, wherein said heated recycle stream is admixed with said feed stream.

8. A process for recovering a processing liquid from a feed stream comprising said processing liquid, water, at least one component less volatile than said processing liquid, and at least one alkaline earth metal cation, said process comprising:

introducing said feed stream into a first heating zone to volatilize said water to produce a first vapor stream comprising water and any vaporized portion of said processing liquid, and a first residuum stream comprising processing liquid, at least some of said less volatile component, and any solids originally present in said feed stream or formed in said first heating zone until the water content of said first residuum stream reaches a predetermined amount;

introducing at least one precipitant into said first heating zone, said precipitant comprising an anion which reacts with said alkaline earth metal cation to form at least one substantially water-insoluble salt of said alkaline earth metal cation;

recovering at least a portion of said first vapor stream;

introducing a first portion of said first residuum stream into a second heating zone to produce a first heated recycle stream;

introducing said first heated recycle stream into said first heating zone;

introducing a second portion of said first residuum stream into a third heating zone once said predetermined amount of water in said first residuum stream has been reached to volatilize at least some of said second portion of said first residuum stream to produce a second vapor stream comprising water and said vaporized portion of said processing liquid, and a second residuum stream containing at least some of said less volatile components and any solids originally present in said feed stream or found in said third heating zone;

recovering and treating said second vapor stream to produce purified processing liquid;

passing at least a portion of said second residuum stream through a fourth heating zone to produce a second heated recycle stream;

introducing said second heated recycle stream into said third heating zone;

introducing said at least one precipitant into said third heating zone;

recovering solids including said substantially water-insoluble salt from said third heating zone.

9. The process of claim 8, further comprising:

splitting said second portion of said first residuum stream into a first fraction and a second fraction;

removing solids, including said substantially water-insoluble salt of said alkaline earth metal cation, from said first fraction to produce a solids-free stream and a solids-rich stream;

recovering and treating said solids-free stream to produce concentrated processing liquid containing residual dissolved salts;

introducing said solids-rich stream into said third heating zone.

10. The process of claim 8, wherein said precipitant is introduced into at least one of said feed stream into said first heating zone, said portion of said first residuum stream into said third heating zone, or both.

11. The process of claim 10, wherein said precipitant is introduced directly into one of said first heating zone, said third heating zone, or both.

12. The process of claim 8, wherein said precipitant comprises one of carbonate, sulfate, oxalate, hydroxide, and mixtures thereof.

13. The process of claim 8, wherein said alkaline earth metal cation is selected from one of calcium, magnesium, strontium, barium, and mixtures thereof.

14. The process of claim 8, wherein said third heating zone is under vacuum.

15. The process of claim 8, wherein said heated recycle stream is admixed with the feed stream.

16. The process of claim 8, wherein said second heated recycle stream is admixed with said second portion of said first residuum stream introduced into said third heating zone.

17. The process of claim 8 wherein said second vapor stream is recovered to produce purified processing liquid and recombined with said solids-free stream to produce concentrated processing liquid containing residual dissolved salts.

* * * * *